Sept. 20, 1932.  J. A. CARUFEL  1,878,673

MARKER

Filed June 28, 1929

Jules A. Carufel
INVENTOR

BY Victor J. Evans
ATTORNEY

Patented Sept. 20, 1932

1,878,673

UNITED STATES PATENT OFFICE

JULES A. CARUFEL, OF ST. PAUL, MINNESOTA

MARKER

Application filed June 28, 1929. Serial No. 374,581.

My present invention has reference to a measuring rule or stick, which is primarily devised for use by paper hangers, and the object of the invention is the provision of an article of this character with a marking device, that comprises a spring plate fixed to the face of the rule or stick, adjacent to one end thereof bowed or inclined from its said fixed portion and having an outer end which is guided through a notch in the end of the rule or stick and formed at its edge with a V-shaped notch to provide the corners thereof with marking prongs, designed to penetrate the paper and mark the same when the spring is depressed toward the rule or stick.

The drawing illustrates a satisfactory embodiment of the improvement reduced to practice.

Figure 1:
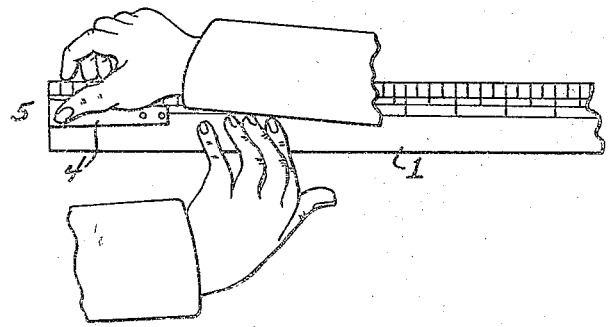
Figure 1 is a view illustrating the improvement in operative position.
Figure 2:
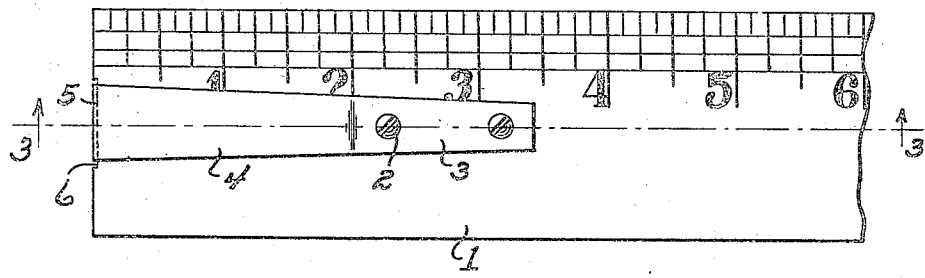
Figure 2 is a top plan view of a measuring rule or stick provided with the improvement.
Figure 3:
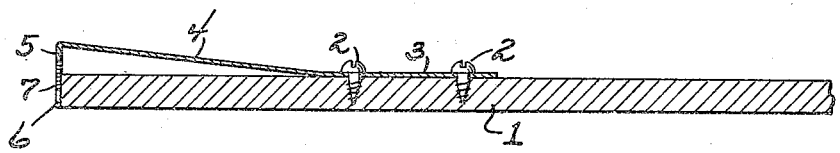
Figure 3 is a sectional view on the line 3—3 of Figure 2.
Figure 4:
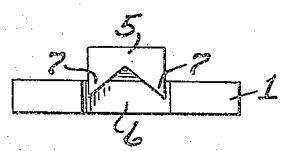
Figure 4 is an end view thereof.

In the drawing the numeral 1 designates a measuring rule or stick divided by lines into inches and fractions thereof. The rule or stick 1, adjacent to one or both of its ends has fixed thereon by means preferably in the nature of screws 2 the inner flat end of a spring plate. From its connected portion the spring plate is inclined or arched, as at 4, to arrange the same away from contact with the rule or stick 1. The outer or free end of the said part 4 of the spring is bent angularly in the direction of the rule or stick 1, as indicated by the numeral 5, and this angle end is received in the notch 6 in the end of the rule or stick 1. The end 5 of the spring is formed with a V-shaped notch and provides the corners thereof with prongs 7, respectively, and these prongs when the part 4 is depressed by the thumb of the operator, as disclosed by Figure 1 of the drawing to bring the said part 4 against the face of the rule or stick will enter the paper which has been measured by the rule and mark the same so that a straight edge may be arranged on the paper in a line with the said marks and the paper cut in the usual manner by scissors or shears.

Obviously the end 5 is of a greater length than the thickness of the rule or stick and can be made with one or more prongs.

Having described the invention, I claim:

A marker including a ruler having a notch in one end, a tapered resilient plate detachably secured to the upper face of the ruler and inclining upwardly therefrom and towards the notch, said plate bent angularly adjacent the free end and extending into the notch to be guided thereby and having a V-shaped notch with the apex disposed uppermost to provide spaced prongs to mark an object when moved below the lower face of the ruler by pressing the plate downwardly towards the upper face of the ruler.

In testimony whereof I affix my signature.

JULES A. CARUFEL.